Jan. 13, 1931.  A. L. V. C. DEBRIE  1,789,220

CINEMATOGRAPH VIEW TAKING APPARATUS

Filed June 13, 1927

INVENTOR
André L. V. C. Debrie
by
Langner, Parry, Card and Langner
Attys.

Patented Jan. 13, 1931

1,789,220

UNITED STATES PATENT OFFICE

ANDRÉ LÉON VICTOR CLÉMENT DEBRIE, OF PARIS, FRANCE

CINEMATOGRAPH VIEW TAKING APPARATUS

Application filed June 13, 1927, Serial No. 198,669, and in France July 13, 1926.

My patent application Ser. No. 95,416 filed on March 17, 1926 has for its object a cinematographic or photographic view taking apparatus adapted to be easily loaded in broad daylight and constituted by two parts: the front part contains the object glass or glasses and the film driving mechanism whereas the rear part which can be quickly and easily secured to the front part contains the film holders which may either be separate or constitute one single box for the unimpressed and impressed film.

In such apparatuses it is necessary to properly put together the two parts and chiefly to correctly set the film in the rear part with reference to its driving mechanism which is contained in the front part.

In view of this the rear part bears a catch provided with two projections one of which engages normally a perforation of the film, whereas the second shorter one is pushed back, when the front part is fitted on the rear part by a projection borne by the said front part whereby the catch is rocked and the film is released by the first mentioned projection, the driving mechanism (clutch or tooth) borne by the front part engaging then a perforation in the film.

Moreover an arrangement allows the film to be held in its guiding channel to ensure its correct passing in front of the view taking aperture.

Lastly a special device allows the film to be properly unwound between its feed reel and is take-up reel through its guiding channel.

Figure 1:
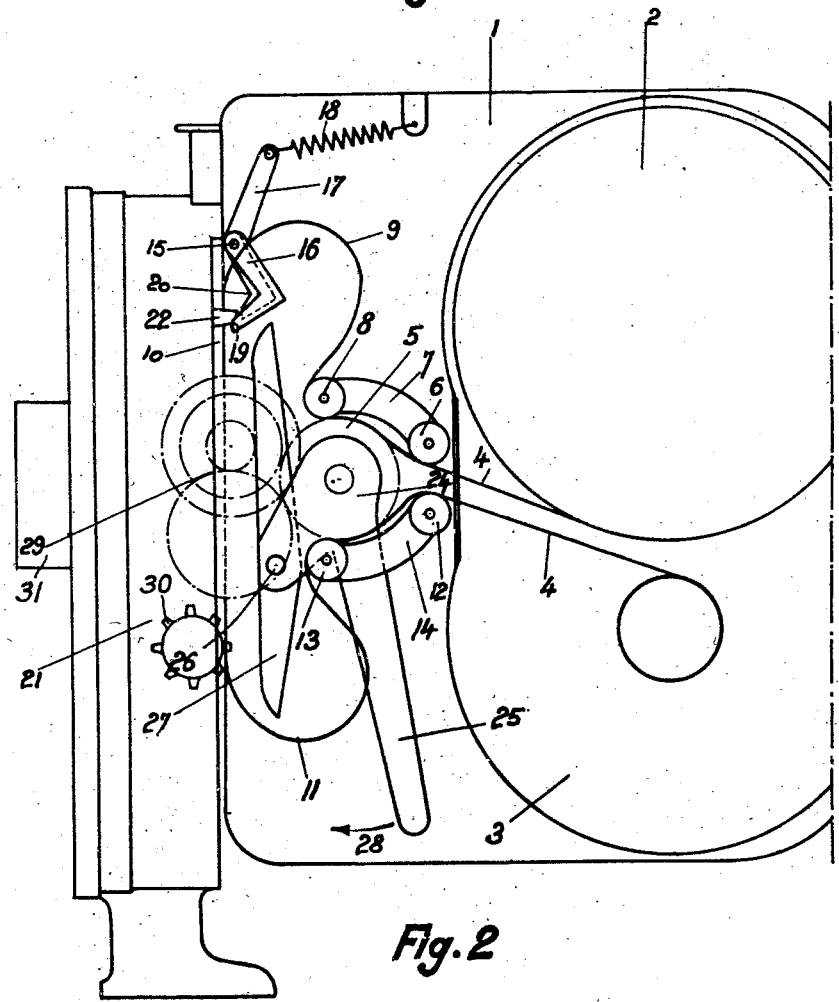
Figure 2:
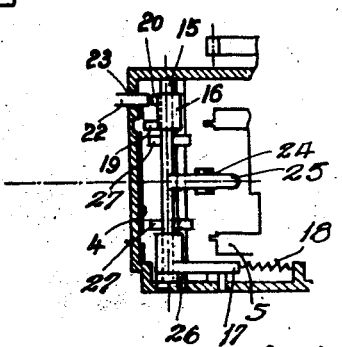

I have shown by way of example on appended drawings:

On Figure 1 a diagrammatical side view of an apparatus according to my present invention, and on Figure 2 a horizontal section of the film engaging catch.

The rear part 1 of the apparatus contains the film feed reel 2 and the film take-up reel 3 which may be disposed in a single box closed by a suitable cover. The film 4 when it is wound off the feed reel 2 passes over a toothed drum 5 rotating round its axis and drawing the film along with it. To ensure this movement the film is pressed against the drum by the stationary roller 6 mounted loosely on its spindle to which is pivotally secured an incurved lever 7 ending with a second movable roller 8 rotatably secured to its spindle, and also pressing the film against the drum.

The film 4 after leaving the drum 5 makes a loop 9 and enters a channel 10 borne by the rear part 1 and passing in front of the view taking aperture. The film then makes a second loop 11 and is engaged again by the teeth of the drum 5 against which it is pressed by the stationary roller 12 and the movable roller 13 connected by the lever 14 which is adapted to pivot round the stationary axis of the first roller 12.

At the front of the rear part of the apparatus a horizontal shaft 15 is adapted to rock. Its axis is parallel to the plane of the view taking aperture and it is provided with a projection 17 connected through a spring 18 to a stationary point of the apparatus. The shaft has a depending catch portion 16 bearing two projections 19 and 20 of unequal length and disposed in two different vertical planes (Fig. 2). Under the action of the spring 18 the catch 16—17 rocks whereby its projections point towards the front wall of part 1. Thus the longest projection 19 engages a perforation of the film 4 with a view of ensuring the proper placing of the latter in its channel when putting the parts of the apparatus together and when view taking.

When the front part 21 is mounted on part 1, a projection 22 borne by the former engages an opening 23 provided on the front wall of part 1 and comes against the projection 20 of the catch 16 which is caused to rock whereby the projection 19 releases the film. A film driving mechanism of which only the sprocket wheel 30 is shown and an object glass 31 are provided on the front part 21. The film driving mechanism engages automatically a perforation because, the position of the film being ensured by the projection 19, the said clutch or tooth will necessarily correctly engage the perforation.

The device for pressing the film 4 inside the channel 10 is constituted as follows: a part 24 ending with a controlling lever 25 may pivot round the axis of the drum 5 and bears a spindle 26 on which the pressing part 27 is pivotally secured. A bolting device, automatic or not, not shown, keeps part 27 in a position such as will make its operative side remain parallel to the film passing in the channel 10. It is sufficient to make the lever 25 pivot by hand or otherwise in the direction of the arrow 28 for forcing the pressing part 27 pivotally borne by the spindle 26 and suitably bolted against the film passing in the channel.

The rotation of the driving drum 5 round its axis is produced by a gearwork 29 borne by the front part 21 of the apparatus.

What I claim is:

1. An apparatus for cinematographic and photographic view taking comprising a front part containing the objective and the film driving mechanism, a rear part adapted to be secured to the front part and containing the film, the film guiding channel, the film feed and take up reels and the reel holders, a device borne by the rear part to place accurately the film consisting in a movable dowel penetrating in the side apertures of said film, a fixed projection borne by the front part, means actuated by said projection when the front and rear part are secured together and adapted to cause said dowel to release the film.

2. An apparatus for cinematographic and photographic view taking comprising a front part containing the objective and the film driving mechanism, a rear part adapted to be secured to the front part and containing the film, the film guiding channel, the film feed and take up reels and the reel holders, a catch pivotally secured to the front wall of the rear part, a spring secured to one end of the catch and adapted to urge it rearwards, two projections of unequal length disposed in different vertical planes and borne by said catch, the longer projection being adapted to normally engage a perforation of the film and a projection borne by the rear side of the front part and adapted to force the shorter projection backwards when the two parts are assembled.

In testimony whereof I have signed my name to this specification.

ANDRÉ LÉON VICTOR CLÉMENT DEBRIE.